United States Patent Office 3,006,970
Patented Oct. 31, 1961

3,006,970
CATALYTIC HYDRATION OF ALCOHOLS
Harold Beuther, Pen Hills, Raymond C. Odioso, Glenshaw, Bruce K. Schmid, McCandless Township, Allegheny County, and Robert C. Zabor, Glenshaw, Pa., assignors to Gulf Research & Development Company, Pittsburgh, Pa., a corporation of Delaware
No Drawing. Filed July 7, 1958, Ser. No. 746,671
6 Claims. (Cl. 260—641)

This invention relates to catalyst compositions and to processes for the use of these catalysts in the hydration of olefins.

We have now discovered that compositions having at least one metal selected from the group comprising group VI and group VIII metals either in unsupported form or disposed upon a carrier material wherein the active metals are present in some combination or mixture with sulfur possess a high activity for the hydration of olefins. We have found that such sulfur containing catalysts are especially useful and economical catalysts for olefin hydration.

The sulfided supported catalysts of this invention not only possess high activity for the hydration of olefins to alcohols but also possess good selectivity towards the production of alcohols rather than by-products such as ketones, hydrocarbons, etc., which are sometimes produced in appreciable quantities during the hydration of olefins. For example, in a test employing a catalyst of this invention for the hydration of propylene, the details of which are fully presented in Example 1 below, 43.7 percent of the olefin was converted to alcohol. The only by-product was 0.4 percent acetone with substantially no polymer production.

The catalysts of this invention comprise sulfided compositions having at least one metal selected from the group comprising group VI and group VIII metals either in unsupported form or disposed upon a supporting material. The supported form is preferred for the catalysts of this invention. The most preferred catalysts of this invention comprise a combination of at least one group VI metal and at least one group VIII metal. Examples of preferred group VI metals are tungsten and molybdenum. Tungsten is the most preferred group VI metal. Examples of suitable group VIII metals are iron, cobalt and nickel.

Because of the nature of the process, if a support is employed it must be substantially stable in the presence of water. Examples of suitable supporting materials are alumina, silica-alumina such as a composition comprising approximately 75 percent silica and 25 percent alumina, pumice, kieselguhr, zirconia, phosphates, alum earths, etc. We have found that alumina is an especially useful support and is conducive to high conversions to the alcohol with a very small concomitant production of by-product ketones and hydrocarbons. We have also found that a 75 percent silica and 25 percent alumina support is conducive to high conversions of the olefin to the corresponding alcohol.

In the preferred form of our invention where a supporting material is employed, the total amount of group VI and group VIII metals present should be between 5 and 50 percent of the total catalyst weight generally, expressed as pure metals, and preferably should be between 20 and 30 percent of the total catalyst weight. If both group VI and group VIII metals are present the atomic ratio of group VI metal to group VIII metal should be between 100 to 1 and 0.5 to 1 generally and preferably should be between 5 to 1 and 1 to 1. The total amount of sulfur on the catalyst should be between 0.5 to 30 percent by weight generally and preferably should be between 1 to 5 percent of the total catalyst weight.

In the preparation of the preferred catalyst compositions of this invention, the carrier material can be impregnated with a solution containing salts of the group VI metal or metals and/or salts of the group VIII metal or metals. The proportions of the salts placed in solution are adjusted to produce a catalyst containing the desired amount of metals and the desired ratio of metals to each other. The impregnated carrier is then dried at a temperature sufficiently high to reduce the impregnated metals to the form of the oxide. The metals are then sulfided. The sulfiding step in the preparation of the catalysts of this invention is a solid phase reaction. The impregnated carrier is treated with either a gaseous or liquid sulfur containing substance by exposing the outer surface and pores of the impregnated carrier to this sulfur containing material. Examples of suitable sulfiding agents are hydrogen sulfide, methylsulfide, propylsulfide, ammonium sulfide, propyl mercaptan, etc. The sulfur in the finished catalyst probably exists in several different forms of combination with the active metals or even as a mechanical mixture. For example, the product of the sulfiding step probably is a mixture of sulfides, oxides and free sulfur. Oxysulfides can also be present. In one example of the sulfiding process the impregnated carrier is treated with a hydrogen-hydrogen sulfide mixture containing 1 to 100 percent hydrogen sulfide at a temperature of 400° to 800° F. for 1 to 12 hours.

In the event no carrier material is employed, the metals can be sulfided in a similar manner without prior impregnation upon a carrier. For example, an unsupported metallic oxide can be sulfided in a solid phase reaction as described above to produce a mixture of oxides, sulfides, free sulfur and possibly oxysulfides and employed in this state as a catalyst according to the method of this invention.

According to the method of this invention, the sulfided hydration catalysts hereinabove described are contacted with a mixture of olefin and water at hydration conditions of temperature, pressure and water to olefin ratio. If the rate of catalyst deactivation is excessively rapid under particular process conditions, a continuous sulfur containing stream can be injected into the system to maintain the activity of the catalyst at a high level. The injection of a sulfiding agent in this manner acts to maintain high catalyst activity by replacing sulfur lost from the surface of the catalyst during the process. The sulfur containing stream can comprise a water solution of hydrogen sulfide and can be added to either the charge water or olefin feed stream. Employing this method, our novel sulfided olefin hydration catalysts can be maintained in a highly active sulfided state for relatively long throughput intervals.

The supported catalysts of this invention exhibit good selectivity for the production of alcohols rather than by-products such as ketones and paraffins. This high selectivity exists even when the catalyst is freshly put on-stream, which is generally the period of most erratic behavior in olefin hydration catalysis. For example, after a throughput of only seven volumes of liquid olefin per volume of catalyst when employing a supported catalyst of this invention, a 98 percent selectivity to the alcohol is achieved and only 2 percent of the conversion products are by-products. When the unsupported catalysts of this invention are first put on stream, there is an initial period of high by-product production which tends to disappear with increasing throughput to a very high conversion and selectivity in favor of the alcohol.

Hydration reaction temperatures should lie within the range of 300° F. to 700° F. We have found that the optimum temperature to be employed is uniform regardless which active metal or combination of metals is employed. Although the process can be carried out batchwise, it is preferably carried out in a continuous manner. The space velocity should be between 0.2 and 20.0 liquid volumes of olefin per hour per volume of catalyst generally and preferably 0.5 to 5.0 liquid volumes of olefin per hour per volume of catalyst. The water to olefin mole ratio can vary between 0.5 and 50. The reactants can pass through the reactor in either upflow or downflow operation. Whatever pressure is employed must be high enough to maintain at least part of the water feed in the liquid state, thereby favoring the formation of the alcohol. In general, a suitable hydration pressure range to be employed is 500 to 20,000 pounds per square inch gauge.

We have found that the optimum temperatures to be employed for the highest yields of alcohol when employing the catalysts of this invention vary depending upon the particular olefin being hydrated. When ethylene is being hydrated, highly superior conversions are achieved by employing a temperature in the range of 570° F. to 670° F. When propylene is being hydrated the best conversions are achieved at a temperature between 475° F. and 575° F. In the conversion of butene-1 and butene-2 best results are achieved at 425° F. to 575° F., whereas in the conversion of isobutylene highest conversions to the alcohol are obtained at hydration temperatures of 325° F. to 475° F. In the conversion of 2-methylbutene-1 and 2-methylbutene-2 approximately a constant yield is obtained over the entire 300° F. to 700° F. temperature range of this invention with no optimum occurring at any point within this overall range.

The sulfided hydration catalysts hereinabove described can be employed for the hydration of any type of olefin such as straight chain olefins, including internal olefins, as well as cyclic olefins, branched chain olefins and diolefins or mixtures of the same. The sulfided catalysts of this invention can be employed for the hydration of olefins having a low number of carbon atoms such as ethylene or butene as well as for the hydration of normal or iso olefins having a higher number of carbon atoms such as pentene, heptene, undecene, dodecene, hexadecene, octadecene, nonadecene, etc. 2-butene is an example of an internal olefin that may be employed and cyclopentene is an example of a suitable cyclic olefin charge.

A series of tests were conducted to illustrate the high activity of the sulfided catalysts of this invention. Table 1 illustrates the conversions attained by employing a sulfided nickel-tungsten supported catalyst. Table 1 further illustrates the beneficial effect on the activity of the sulfided nickel-tungsten supported catalyst achieved by continuously introducing hydrogen sulfide with the charge water.

The catalyst employed in obtaining the data shown in Table 1 comprised 5.9 percent nickel and 17.9 percent tungsten on a 10–20 mesh, granular alumina support. This catalyst was prepared with the active metals in the form of their oxides and was thereupon sulfided with a 92 percent hydrogen—8 percent hydrogen sulfide gas mixture. The presulfiding operation was accomplished in four hours at atmospheric pressure and 600° F. using a flow rate of 1135 standard volumes of gas mixture per volume of catalyst per hour. After this treatment, the sulfur content of the catalyst was determined to be 6.3 percent by weight, indicating that not all of the active metals were converted to their sulfides. In the tests illustrated in the second column of Table 1, a similar sulfided catalyst was used with continuous addition of hydrogen sulfide to the feed water. The feed water was saturated with hydrogen sulfide by bubbling hydrogen sulfide gas through the water. The saturated feed water contained approximately 0.2 mole percent hydrogen sulfide.

The sulfided catalysts whose test results are illustrated in Table 1 were evaluated at standard condition of 250° F., 3675 pounds per square inch gauge, and 15:1 mole ratio of water to olefin. The olefin employed in all the tests illustrated in Table 1 was propylene. All runs were made in downflow operation.

The conversion of propylene to the alcohol was tabulated as a function of space velocity and a series of consecutive tests at increased space velocities over a range of 0.95 to 2.26 liquid volumes of propylene per hour per volume of catalyst was conducted as shown in FIGURE 1. It is noted that the space velocity range shown in FIGURE 1 is not broad enough to appreciably affect conversions, but that the space velocity tests shown were made consecutively and the conversions shown are actually a function of change in throughput rather than the result of change in space velocity.

TABLE 1

*Hydration of propylene to isopropyl alcohol*

Conditions:
  Temperature—520° F.
  Pressure—3675 pounds per square inch gauge
  Water to olefin ratio—15.0 moles per mole.

| Propylene space velocity, liquid volume per hour per volume catalyst | Conversion to isopropyl alcohol mole percent | |
|---|---|---|
| | Sulfided alumina supported nickel-tungsten catalyst | Sulfided alumina supported nickel-tungsten catalyst with continuous hydrogen sulfide addition |
| 0.86 | | |
| 0.95 | | |
| 0.98 | | 43.5 |
| 1.00 | 40–50 | |
| 1.02 | | |
| 1.08 | 43.5 | |
| 1.22 | | |
| 1.24 | | |
| 1.36 | | 43.5 |
| 1.48 | | 42.0 |
| 1.94 | | |
| 2.04 | | |
| 2.16 | 24 | 41 |
| 2.26 | 18.5 | |

As shown in Table 1, at the throughput corresponding to a space velocity of about 1 liquid volume of charge per hour per volume of catalyst the conversion of propylene to isopropyl alcohol in the presence of the sulfided catalyst is about 40–50 mole percent. It is seen from Table 1 that increased throughput results in lower conversions of propylene to isopropyl alcohol so that at the increased throughput corresponding to a space velocity of 2.26 liquid volumes of propylene per hour per volume of catalyst a conversion of 18.5 percent is realized. This activity decline is attributed to gradual loss of sulfur from the catalyst. The second column of Table 1, in which increased space velocity likewise corresponds to increased throughput, shows that with the continuous addition of hydrogen sulfide in the feed water the activity of the sulfided catalysts remains substantially undiminished with increased propylene throughput.

Table 2 presents further data illustrating the effect of continuous hydrogen sulfide addition on the activity of a sulfided nickel-tungsten supported catalyst. Table 2 illustrates the effect of continuous addition of hydrogen sulfide in the feed water during the conversion of liquid propylene to isopropyl alcohol at various total throughputs ranging from 5 to 91 volumes of liquid propylene per volume of catalyst while employing a sulfided nickel-tungsten-alumina catalyst of the same composition employed in obtaining the data shown in Table 1. The data shown in Table 2 were obtained from tests made by downflow operation.

TABLE 2

*Effect of continuous hydrogen sulfide addition on activity of sulfided nickel-tungsten-alumina hydrogen catalyst*

Conditions:
    Temperature 520° F.
    Pressure—3675 pounds per square inch gauge.
    Space velocity—1.10 volume liquid propylene per hour per volume of catalyst.
    Water-olefin ratio—15.0 moles per mole.

| Throughput: Volume liquid propylene per volume of catalyst | Conversion to isopropyl alcohol—mole percent | |
|---|---|---|
| | Without hydrogen sulfide in feed water | With 0.2 mole percent hydrogen sulfide in feed water |
| 5 | | 32 |
| 7 | | 40 |
| 20 | 41 | 41 |
| 30 | 35 | 42 |
| 43 | 23 | 43 |
| 50 | 17 | 43 |
| 56 | | ¹ 41 |
| 61 | | ¹ 36 |
| 66 | | ¹ 38 |
| 71 | | ¹ 36 |
| 76 | | ¹ 37 |
| 81 | | ¹ 33 |
| 86 | | ² 42 |
| 91 | | ² 40 |

¹ Hydrogen sulfide discontinued.
² Resumed addition of hydrogen sulfide.

As shown in Table 2 an increase of total throughput of propylene from 20 to 50 volumes of liquid propylene per volume of catalyst resulted in a decreased conversion to the alcohol from 41 percent to 17 percent when no hydrogen sulfide was included in the feed water stream. However, when a catalyst of the same composition was employed with the continuous addition of 0.2 mole percent of hydrogen sulfide in the feed water, an increase of total throughput from 20 to 50 volumes of liquid propylene per volume of catalyst resulted in no substantial change in percent conversion of propylene to isopropyl alcohol. However, while continuing the throughput of propylene from 50 to 81 volumes per volume of catalyst in the absence of continued addition of hydrogen sulfide in the feed water stream, the conversion of propylene decreased from 43 to 33, indicating a substantial loss in catalyst activity due to loss of sulfur from the catalyst. When the addition of hydrogen sulfide was again commenced, the conversion of propylene to isopropyl alcohol immediately increased from 33 to 42 illustrating the beneficial effect of the continuous addition of small amounts of hydrogen sulfide to the reactor.

Although we are not bound by any particular theory, the loss of activity with throughput of the sulfided catalysts of this invention may be due to the fact that the sulfided catalyst probably loses its sulfur content during the process and becomes converted during the hydration to the non-sulfided form. The reduction of catalyst activity due to the loss of sulfur from the catalyst can be overcome by the addition of sulfur in some form to the hydration unit. If the sulfur is added in the form of hydrogen sulfide and is dissolved with the feed water, the feed water can contain from 0.1 to 20 mole percent hydrogen sulfide. In the tests illustrated in Table 2, the feed water contained 0.2 mole percent hydrogen sulfide. It is seen from Table 2 that at a total throughput of 50 volumes of propylene per volume of catalyst without hydrogen sulfide addition the activity of the sulfided supported catalyst falls to 17 percent conversion whereas with the continuous addition of 0.2 mole percent of hydrogen sulfide in the feed water the activity of a similar sulfided catalyst at the same throughput corresponds to a 43 percent conversion of the olefin to the alcohol.

As shown in Table 2, the initial test with the fresh sulfided nickel-tungsten on granulated alumina catalyst with hydrogen sulfide in the feed water indicated a low conversion of olefin to alcohol. This is due to the fact that the sulfided catalyst has an initial extremely high activity for the production of by-products. However, this initial activity for the production of by-products is substantially eliminated after a relatively short throughput with the result that increased yields of alcohol are obtained. This erratic behavior experienced when the sulfided catalysts of this invention are first put onstream can be eliminated by either sulfiding to a lesser degree or initiating the process with a non-sulfided catalyst but with hydrogen sulfide in the feed water to gradually sulfide the catalyst. As shown, at a throughput of only 7 volumes liquid propylene per volume of catalyst, the initial erratic behavior substantially disappeared.

As stated above, the suitable concentration of hydrogen sulfide in the feed water can be as low as about 0.1 mole percent or as high as 20 mole percent or higher. The lower concentrations of hydrogen sulfide are preferred in order to avoid any unnecessary sulfiding of feed or other waste of hydrogen sulfide. The desired concentration is achieved by ascertaining the solubility of hydrogen sulfide in water at a given temperature and pressure and bubbling hydrogen sulfide through the water under the desired conditions. The hydrogen sulfide can also be added to the feed olefin stream if desired. The concentration of hydrogen sulfide in the feed water can be maintained constant as the water to feed olefin ratio changes since the aging rate of the catalyst is proportional to the amount of water flowing over the catalyst and not the amount of olefin. Any hydrogen sulfide remaining in the water is freed during the subsequent distilative separation of the water and alcohol product and can be recycled if desired. Hydrogen sulfide can also be added intermittently in somewhat higher concentrations to regenerate the catalyst while processing. This procedure would require only intermittent hydrogen sulfide recovery operations and the treatment of a smaller amount of product for the possible removal of sulfur compounds.

In addition to hydrogen sulfide other sulfur containing materials, both organic and inorganic, can be used, such as ammonium sulfide, ethyl sulfide, propyl sulfide, propyl mercaptan, etc.

To show that the catalytic activity observed with constant hydrogen sulfide addition is not due to catalytic behavior of dissolved hydrogen sulfide alone, a blank test was made by passing propylene and water containing 0.2 mole percent hydrogen sulfide under the reaction conditions of this invention over quartz chips. A negligible conversion to alcohol was obtained, indicating that the hydrogen sulfide alone was not the catalytic entity.

Table 3 presents the results of tests performed with catalysts of various active metal combinations according to this invention.

TABLE 3

*HYDRATION OF PROPYLENE OVER A VARIETY OF SUPPORTED CATALYSTS*

Conditions:
    Temperature—520° F.
    Pressure—3675 pounds per square inch gauge.
    Water to olefin mole ratio—15:1.
    Space velocity—1.0 liquid volume propylene per hour per volume catalyst.

| Throughput: Volume propylene per volume catalyst | Conversion to alcohol—Mole percent ||||||||
|---|---|---|---|---|---|---|---|---|
| | Sulfided 25 percent tungsten on 10-20 mesh 75 percent silica—25 percent alumina support with hydrogen sulfide in feed ||| Sulfided 31.6 percent nickel on 10-20 mesh alumina support with hydrogen sulfide in feed ||| Sulfided 21 percent molybdenum on 1/8 inch pelleted alumina with hydrogen sulfide in feed |||
| | Isopropyl alcohol | Acetone | Propane | Isopropyl alcohol | Acetone | Propane | Isopropyl alcohol | Acetone | Propane |
| 2 | ----- | ----- | ----- | 41 | 2 | 2 | ----- | ----- | ----- |
| 4 | 37 | 2 | 5 | 41 | 2 | 2 | 14 | 15 | 15 |
| 6 | 37 | 2 | 4 | 41 | 2 | 2 | 16 | 15 | 15 |
| 8 | 37 | 2 | 4 | 41 | 2 | 2 | 17 | 15 | 15 |
| 10 | 37 | 2 | 3 | 41 | 1 | 2 | 17 | 15 | 15 |
| 12 | 37 | 2 | 3 | 41 | 1 | 2 | 18 | 15 | 15 |
| 14 | ----- | ----- | ----- | 41 | 1 | 2 | 19 | 15 | 15 |

| Throughput—Volume propylene per volume catalyst | Conversion to alcohol—Mole percent ||||||
|---|---|---|---|---|---|---|
| | Sulfided 25 percent nickel plus tungsten on 10-20 mesh alumina with hydrogen sulfide in feed ||| Sulfided 4.0 percent cobalt plus 18 percent molybdenum 1/8 inch pelleted alumina with hydrogen sulfide in feed |||
| | Isopropyl Alcohol | Acetone | Propane | Isopropyl Alcohol | Acetone | Propane |
| 2 | ----- | ----- | ----- | 12 | 8 | 5 |
| 4 | ----- | ----- | ----- | 12 | 8 | 14 |
| 6 | 40 | 3 | 2 | 12 | 8 | 18 |
| 8 | 48 | 1 | 1 | 11 | 9 | 11 |
| 10 | 51 | 1 | 1 | 11 | 9 | 11 |
| 12 | 53 | 1 | 1 | 10 | 12 | 11 |
| 14 | 54 | 1 | 1 | ----- | ----- | ----- |
| 26 | 54 | 1 | 1 | ----- | ----- | ----- |

As seen in Table 3, the sulfided nickel-tungsten-alumina catalyst gives the best conversion to the alcohol and also the best selectivity. This catalyst is shown to be superior to the cobalt-molybdenum catalyst and to any catalyst shown wherein only one active metal is employed. However, when a catalyst comprising only one active metal is employed, nickel alone or tungsten alone are shown to be preferable both in terms of total conversion and in terms of selectivity.

It is noted that all the catalytic metal combinations shown in Table 3 have been found to possess substantially the same optimum hydration temperature and none of these catalysts exhibited substantially improved conversions at temperatures different from the reaction temperature indicated.

Tests were made to illustrate the use of an unsupported catalyst of this invention. Table 4 shows the use of sulfided blue oxide of tungsten for the hydration of propylene to isopropyl alcohol.

TABLE 4

*Effect of throughput on hydration of propylene over sulfided $W_2O_5$ catalyst*

Conditions:
    Temperature—520° F.
    Pressure—3675 pounds per square inch gauge.
    Space velocity—1.0 liquid volume propylene per hour per volume of catalyst.
    Reactant ratio—15.0 moles water per mole of propylene.

| Throughput—Volume propylene per volume of catalyst | Conversion—Mole percent ||
|---|---|---|
| | Isopropyl alcohol | By-products |
| 10 | 29 | 47 |
| 20 | 35 | 37 |
| 30 | 41 | 27 |
| 40 | 47 | 17 |
| 50 | 53 | 7 |

The data of Table 4 show an initial high tendency of the unsupported catalysts for the production of by-products. However, after a throughput of 50 volumes of olefin per volume of catalyst, a high selectivity in favor of the alcohol is achieved as well as a high conversion to the alcohol. The initial erratic behavior is probably due to the extremely high activity of the freshly sulfided catalyst for hydrogenation-dehydrogenation reactions which produce acetones by dehydrogenation of alcohols and hydrocarbons by addition of this hydrogen to unreacted olefins. This can be eliminated by sulfiding and aging the catalyst concurrently by the use of an unsulfided unsupported catalyst during start-up operations coupled with the injection of an activating amount of a sulfur containing material into the reactor.

EXAMPLE 1

A catalyst was prepared comprising 5.9 percent nickel and 17.9 percent tungsten in a 1:1 mole ratio. These metals were originally deposited as their oxides and were subsequently converted to the sulfides by heating in nitrogen to 600° F. and then contacting the catalyst with a mixture of hydrogen-hydrogen sulfide at a 12:1 mole ratio of hydrogen to hydrogen sulfide at 600° F. for four hours. The support for this catalyst was an alumina which contains only 0.1 percent silicon as silica. Propylene and water in a mole ratio of 1:15 were charged at a space velocity of 1.1 volumes of liquid propylene per hour per volume of catalyst to a reactor containing the catalyst at an average temperature of 519° F. and a pressure of 3650 pounds per square inch gauge and a sample taken when the throughput was 23.7 volumes of propylene per volume catalyst. The sample showed that of 43.7 percent of the propylene had been converted to isopropyl alcohol, 0.4 percent had been converted to acetone, and the remainder was unconverted propylene. The percentage of the normal propyl alcohol in the isopropyl alcohol was only 0.31 percent.

EXAMPLE 2

Water and octene-1 in a mole ratio of 15:1 were charged to a hydration reactor containing a catalyst comprising sulfided nickel-tungsten upon an alumina support. The catalyst contained 25 percent of nickel and tungsten and 0.2 mole percent hydrogen sulfide was added with the feed water. The reaction temperature was 520° F., the reaction pressure was 3675 pounds per square inch gauge, and the space velocity was 1.0 liquid volume of olefin per hour per volume of catalyst. A substantial conversion of octene-1 to 2-octanol was obtained.

Various changes and modifications may be made without departing from the spirit of this invention and the scope thereof as defined in the following claims.

We claim:

1. A process for the hydration of olefin to alcohol comprising contacting a catalyst comprising a sulfur containing composition having at least one metal selected from the group consisting of group VI and group VIII metals with olefin and water at a temperature of 300° F. to 700° F., a pressure of 500 to 20,000 pounds per square inch gauge and a water to olefin molal ratio of 0.5 to 50, said catalyst prepared by contacting the oxide of at least one metal from the group consisting of group VI and group VIII metals with a compound from the group consisting of hydrogen sulfide, methyl sulfide, propyl sulfide, ammonium sulfide and propyl mercaptan.

2. Claim 1 wherein said compound is hydrogen sulfide.

3. A process for the hydration of olefin to alcohol comprising contacting a catalyst comprising a sulfur containing composition having at least one metal selected from the group consisting of group VI and group VIII metals disposed upon a carrier material which is substantially stable in the presence of water, with olefin and water at a temperature of 300° F. to 700° F., a pressure of 500 to 20,000 pounds per square inch gauge and a molal ratio of water to olefin of 0.5 to 50, said catalyst prepared by contacting the oxide of at least one metal selected from the group consisting of group VI and group VIII metals impregnated upon a carrier material with hydrogen sulfide.

4. A process for the hydration of olefin to alcohol comprising contacting sulfided nickel and tungsten with olefin and water at a temperature of 300° F. to 700° F., a pressure of 500 to 20,000 pounds per square inch gauge and a water to olefin molal ratio of 0.5 to 50, said catalyst prepared by contacting with hydrogen sulfide at a temperature between 400° F. and 800° F. an oxide of nickel and an oxide of tungsten.

5. A process for hydrating olefin to alcohol comprising contacting sulfided tungsten oxide with olefin and water at a temperature of 300° F. to 700° F., a pressure of 500 to 20,000 pounds per square inch gauge and a water to olefin molal ratio of 0.5 to 50, said catalyst prepared by contacting tungsten oxide with hydrogen sulfide at a temperature between 400° F. and 800° F.

6. A process for hydrating olefin to alcohol comprising contacting sulfided tungsten disposed upon a carrier material which is substantially stable in the presence of water with olefin and water at a temperature of 300° F. to 700° F., a pressure of 500 to 20,000 pounds per square inch gauge and a water to olefin molal ratio of 0.5 to 50, said catalyst prepared by contacting with hydrogen sulfide at a temperature between 400° F. and 800° F. tungsten oxide supported upon the carrier material.

References Cited in the file of this patent

UNITED STATES PATENTS

| | | |
|---|---|---|
| 1,999,620 | Van Peski et al. | Apr. 30, 1935 |
| 2,635,119 | Finch et al. | Apr. 14, 1953 |
| 2,753,310 | Riedl | July 3, 1956 |

UNITED STATES PATENT OFFICE
CERTIFICATE OF CORRECTION

Patent No. 3,006,970                                  October 31, 1961

Harold Beuther et al.

It is hereby certified that error appears in the above numbered patent requiring correction and that the said Letters Patent should read as corrected below.

In the grant, line 1, and in the heading to the printed specification, line 3, address of first inventor, for "Pen Hills" read -- Penn Hills --; column 4, line 8, for "condition of 250°" read -- conditions of 520° --.

Signed and sealed this 17th day of April 1962.

(SEAL)
Attest:

ESTON G. JOHNSON                                  DAVID L. LADD
Attesting Officer                                     Commissioner of Patents